July 26, 1966  M. M. GRUICH ETAL  3,262,310
COMPRESSION TESTING MACHINE
Filed Sept. 19, 1963  6 Sheets-Sheet 1
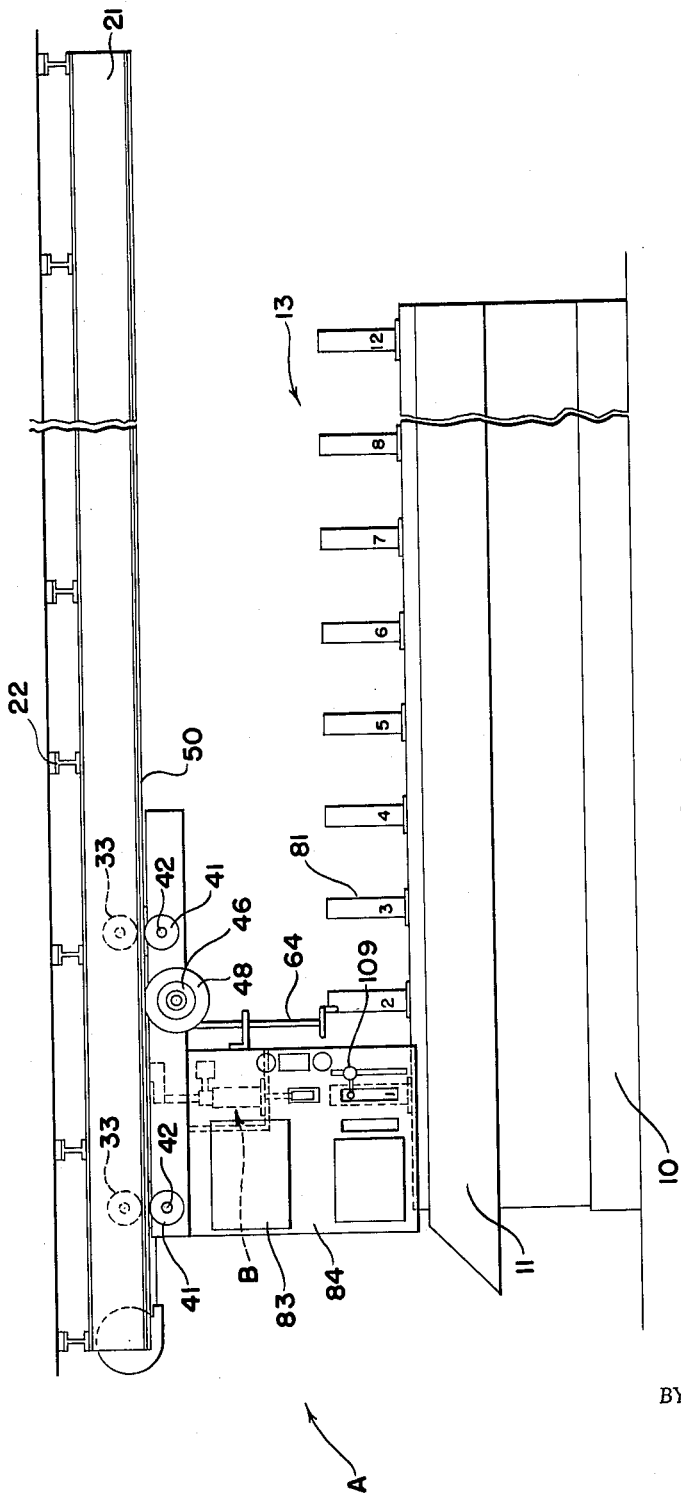
FIG. I
INVENTORS.
MICHAEL GRUICH,
WALLACE E. WASON &
BY ROBERT J. WEAVER
*Fay & Fay*
ATTORNEYS

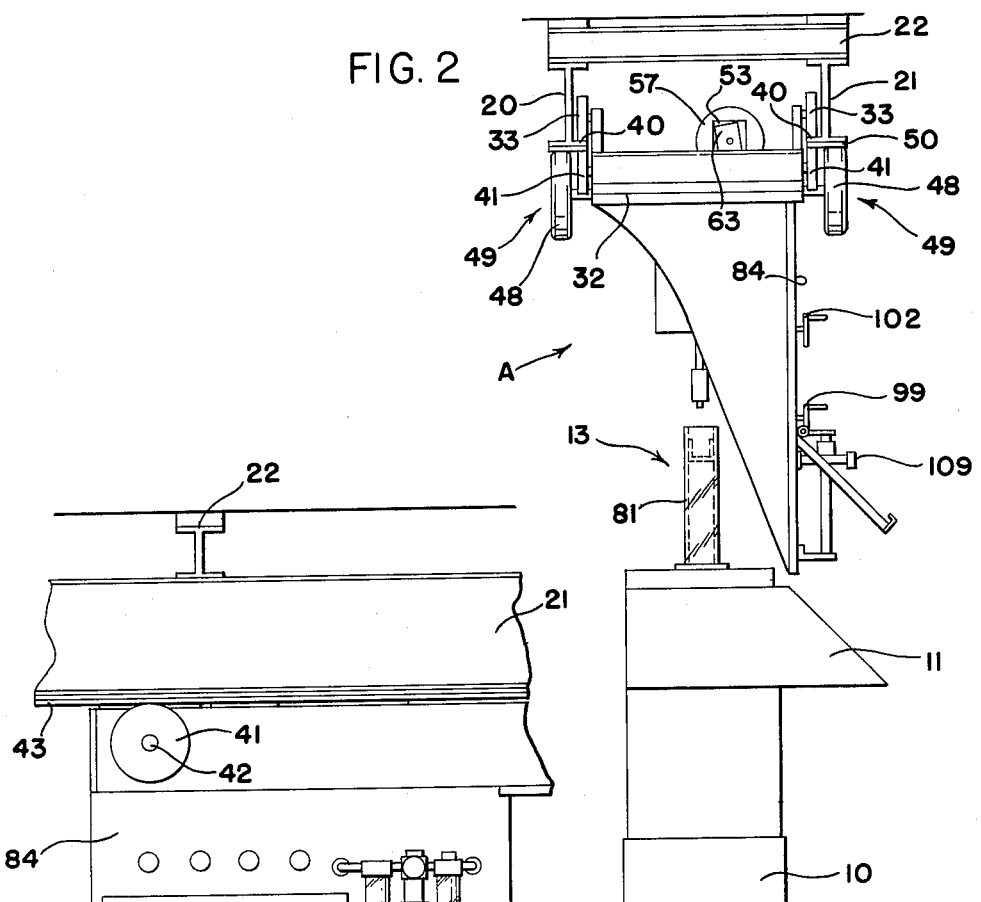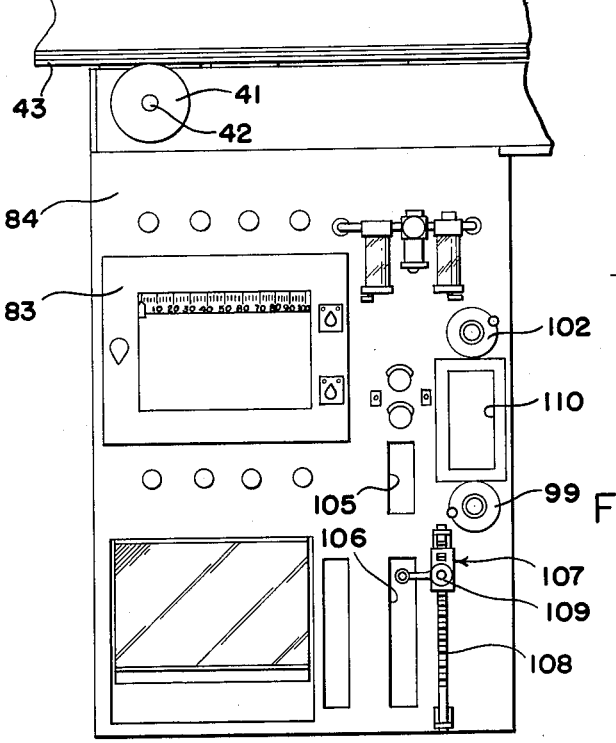

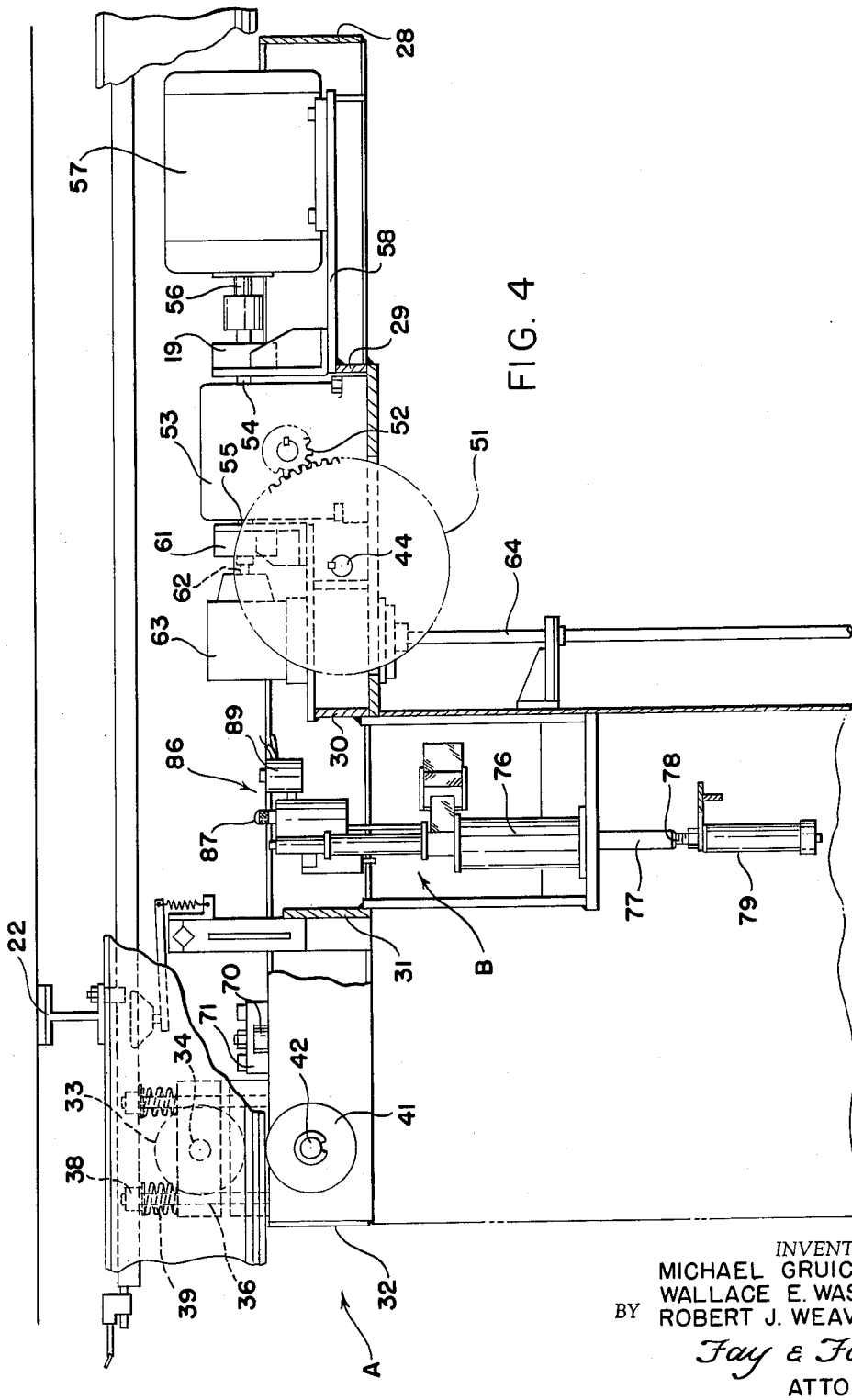

July 26, 1966  M. M. GRUICH ETAL  3,262,310
COMPRESSION TESTING MACHINE
Filed Sept. 19, 1963  6 Sheets-Sheet 4

INVENTORS.
MICHAEL GRUICH,
WALLACE E. WASON &
ROBERT J. WEAVER
BY Fay & Fay
ATTORNEYS

INVENTORS.
MICHAEL GRUICH,
WALLACE E. WASON &
ROBERT J. WEAVER
BY Fay & Fay
ATTORNEYS

INVENTORS.
MICHAEL GRUICH,
WALLACE E. WASON &
BY ROBERT J. WEAVER
Fay & Fay
ATTORNEYS

United States Patent Office 3,262,310
Patented July 26, 1966

3,262,310
COMPRESSION TESTING MACHINE
Michael M. Gruich, 1244 Golden Gate, Cleveland, Ohio;
Wallace E. Wason, 1596 Wrenford, South Euclid, Ohio;
and Robert J. Weaver, P.O. Box 653, Newtonville, N.Y.
Filed Sept. 19, 1963, Ser. No. 309,929
8 Claims. (Cl. 73—94)

This invention relates to a testing machine and more particularly to a soil compression testing machine.

It has become common practice in the construction of projects such as highways and dams to investigate the physical characteristics of the foundation soil on which such projects are to be constructed. A common method of investigation is the triaxial test which is concerned with the stability and deformation analysis of soil strata and deposits. The triaxial test is conducted on undisturbed specimens of soil which are placed in a test cylinder or chamber whereupon a series of investigative operations are performed. One aspect of the triaxial test is the compression test in which the resistance to deformation offered by the soil specimen is measured and plotted versus specimen deformation. Although a compression test is conducted on each soil specimen, it is of relatively short duration, approximately 20 minutes, while the entire series of operations performed on each specimen during the triaxial test consumes a period of several hours.

The practice heretofore has been to use a single piece of equipment for each soil specimen and conduct the full range of investigative operations with the specimen in this equipment. However, this procedure results in the unavailability of each piece of equipment for a period of several hours while one soil sample is being tested despite the fact that the compression testing equipment, which is an integral part of the testing equipment, is needed only but a few minutes of the several hours.

By the utilization of the principles of this invention, it is possible to conduct a compression test on a soil specimen and yet leave the compression testing machine free to conduct compression tests on other soil specimens during the completion of the triaxial test on the first specimen.

It is an object of this invention to provide a movable compression testing apparatus.

It is another object of this invention to provide compression testing apparatus capable of exerting a compressive force on a plurality of spaced apart soil specimens.

It is a further object of this invention to provide a crane-mounted compression testing machine.

It is still another object of this invention to provide an overhead track assembly, a movable carriage mounted on said assembly, and a compression testing device secured to said carriage and movable therewith.

It is a still further object of this invention to provide a multiple drive means for a movable compression testing carriage whereby both rough and fine feeds of said carriage may be accomplished.

Another object of the invention is to provide a compression testing machine having an automatic test cycle and automatic recordation of the test data.

A still further object of this invention is to provide a means for measuring the height of the soil specimen and means for automatically setting the loading control system and cycle.

It is another object of this invention to provide a compression testing carriage movable along a horizontal track and means assuring the exact alignment of the carriage at each point along the track.

It is another object of this invention to provide a movable compression testing machine whereby the data obtained at each placement of the machine may be related to the data obtained at every other placement of the machine.

To the accomplishment of the foregoing and related ends, said invention then consists of the means hereinafter fully described and particularly pointed out in the claims, the following description setting forth in detail one approved means of carrying out the invention, such disclosed means, however, constituting but one of the various ways in which the principles of the invention may be used.

In the drawings wherein like reference numerals indicate like parts in the various views:

FIG. 1 is a side elevation, schematically illustrating the principles of the machine of the instant invention.

FIG. 2 is an end elevation of the machine illustrated in FIG. 1.

FIG. 3 is a partial side elevation showing more in detail the instrument panel of the compression testing machine.

FIG. 4 is a partial side elevation, partly broken away, showing the loading cylinder and the carriage drive mechanism.

Figure 5:
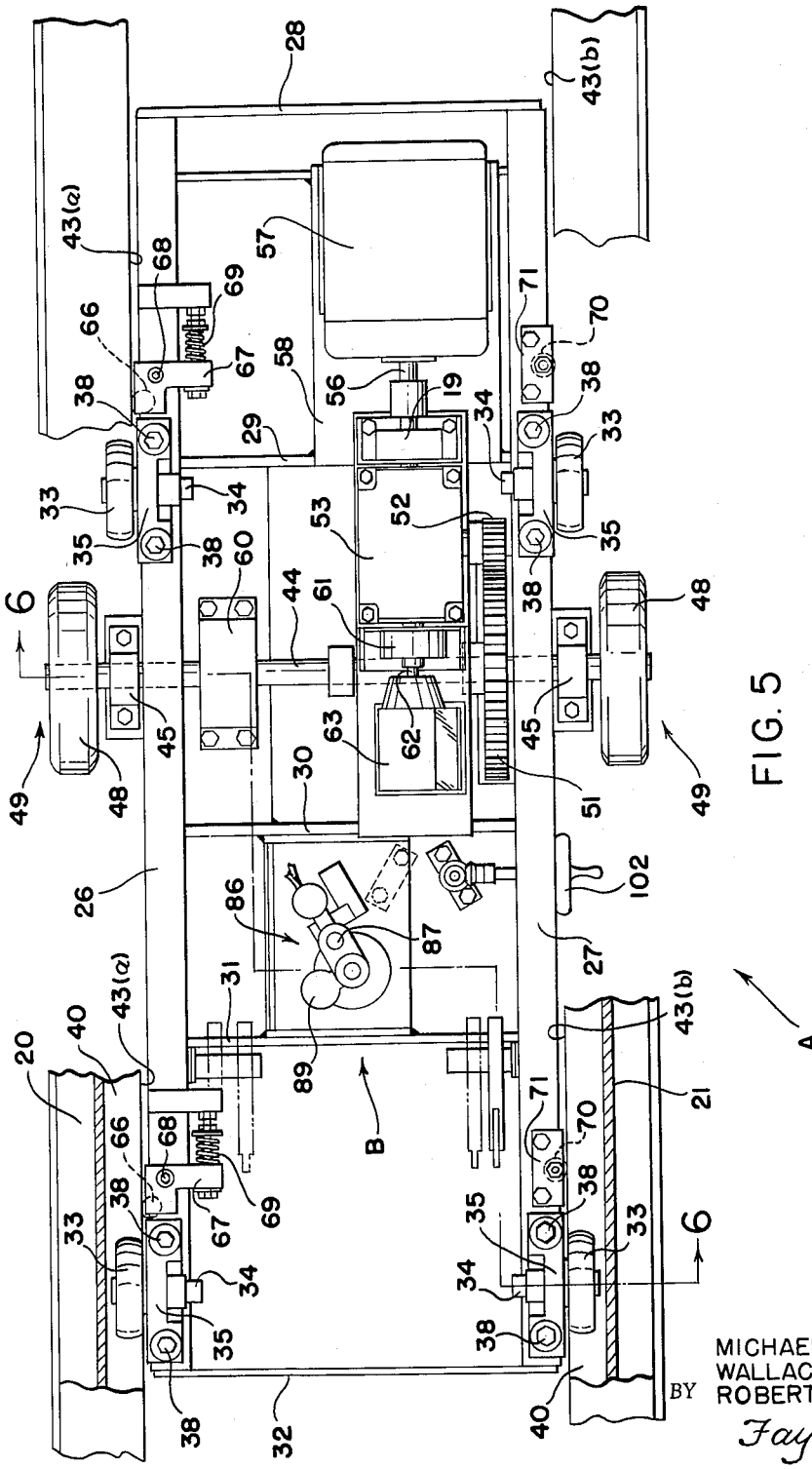
FIG. 5 is a plan view of FIG. 4.

Turning to FIG. 1, there is illustrated the machine of the instant invention as it would be utilized in a test environment. Thus, there is provided a testing bench, indicated generally by the reference numeral 10 which includes a bench control panel 11 and a plurality of test cylinder locations 13. Each of the locations 13 includes conventional test chamber equipment adapted to receive a soil specimen therein.

Secured in position over the testing bench is a track assembly which includes two parallel, spaced apart, I-beam tracks 20, 21 supported by cross beams 22 at periodic intervals along their longitudinal extent. Mounted for movement on the tracks 20, 21 is a carriage assembly, indicated generally by the reference letter A, which carriage assembly, in turn, has secured thereto a compresssion testing apparatus, indicated generally by the reference letter B.

With the broad combinatoin of elements described, it is apparent that the carriage with the compression testing apparatus is movable along the tracks 20, 21 to a position wherein it may be centered selectively over any one of the test cylinder locations 13.

Figure 6:
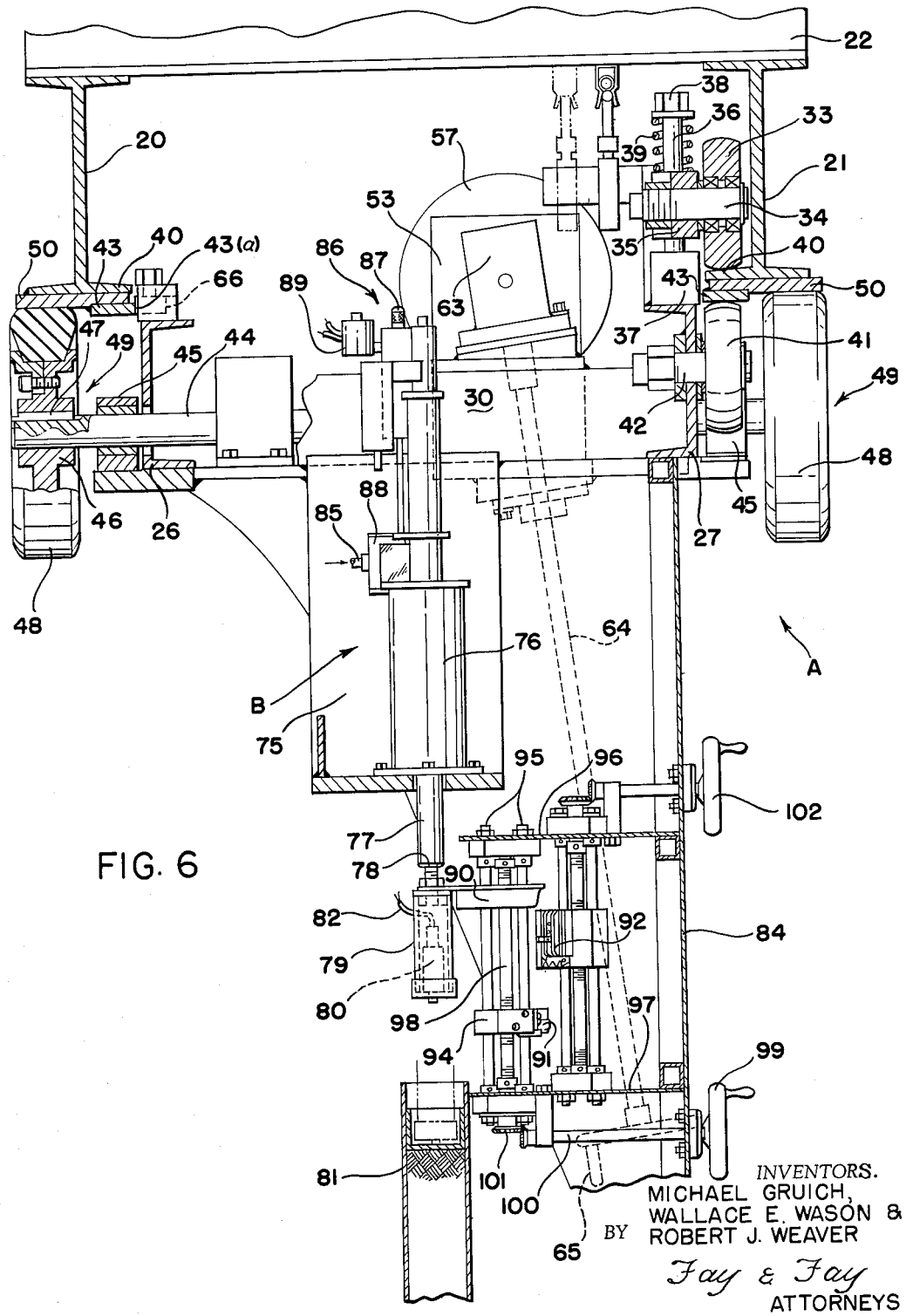
FIG. 6 is an elevation view taken along line 6—6 of FIG. 5.

The carriage A includes a frame consisting of two spaced longitudinal frame members 26, 27 joined by transverse frame members 28, 29, 30, 31, 32. Rotatably secured to the frame members 26, 27 are four hardened steel crown wheels 33 which serve to suspend the carriage from the tracks 20, 21. The wheels 33 are each rotatably mounted on a spindle 34 with each spindle being received in a mounting block 35 (FIG. 6). Each block 35 is slidably supported on two spaced apart guide rods 36 with the rods 36 being received in a base member 37 carried by the frame members. Each of the rods 36 has a nut 38 threadedly engaged at its outer end which serves to retain a compression spring 39 which is interposed between the nut and the mounting block 35. The strength of the springs 39 are such that the mounting blocks 35 are biased to a position wherein the wheels 33 engage the inner edge of one leg 40 of the I-beams which comprise the tracks 20, 21. The strength of the springs 39 must be such that they will resist the combined dead weight of the carriage assembly and the compression apparatus mechanism since the springs are the sole means for maintaining the carriage suspended from the tracks.

The carriage also includes a plurality of wheels 41 which are identical to the crown wheels 33. One of the wheels 41 is oriented beneath each one of the wheels 33 in a manner illustrated in FIG. 4. The wheels 41 are carried by an axle spindle 42 mounted in the longitudinal frame members 26, 27 with the wheels 41 being in engagement with a special machined plate 43 disposed on the under side of each of the tracks 20, 21. The wheels 41 are maintained in engagement with the plates 43 by virtue of the springs 39.

The carriage also includes a transverse axle 44 rotatably received in bearing blocks 45. At either end of the axle 44, there is attached a wheel assembly 49 which includes a wheel hub 46 secured by means of a key 47 to the shaft 44 for rotation therewith. Each of the hubs 46 mount a rubber tire 48 which frictionally engages the under side of the plate 50 carried by the tracks 20, 21. The wheel assembly 49 serves as the drive means for the carriage assembly through the frictional engagement of the tires 48 with the plate 50.

Driving rotation is imparted to the axle 44 through a gear 51 which is secured to the shaft 44. The gear 51 meshes with a pinion 52 which is a part of a conventional speed reducer 53. The speed reducer 53 is a double input reducer having input shafts 54 and 55. The input shaft 54 is coupled by a conventional electrically operated clutch 19 to the output shaft 56 of a two speed electric motor 57. The electric motor is mounted on a plate 58 secured to the carriage assembly 25. In like manner, the speed reducer housing 53 is secured by bolts to a portion of the carriage frame so that it may be seen that the power means for rotating the wheel assemblies 49 and thereby imparting drive to the carriage assembly A are carried by the carriage.

With the electric motor 57 actuated and the clutch 19 engaged, rotation will be imparted to the speed reducer pinion 52 which in turn will cause rotation of gear 51 thereby imparting movement to the carriage along the tracks. The drive system also includes an electric brake of a conventional nature and schematically shown at 60, which brake is automatically actuated when the motor is deenergized thereby to assure that the carriage remains in the adjusted position during the performance of the testing operation.

As noted previously, the speed reducer 53 is of the double input type with a second input shaft 55 being coupled by a conventional clutch 61 to the output shaft 62 of a miter box 63. The input drive to the miter box 63 consists of a shaft 64 to which is coupled a manually rotatable hand wheel 65. The miter box housing, shaft 64 and hand wheel 65 are disposed at an angle such that the hand wheel is readily accessible to the operator of the testing apparatus. The purpose of the manually operable hand wheel 65 is to accomplish a fine adjustment of the carriage as it is centered over the testing chambers. Thus, the operator, by rotation of the hand wheel 65, imparts a rotation to the shaft 64 which is transmitted through the miter box 63 to the shaft 62. With the clutch 19 deenergized and the clutch 61 engaged, a rotation is imparted to the pinion 52 and through the gear wheel 51 to the wheel assemblies 49 thereby moving the carriage along the tracks 20, 21. An electric control which engages the manual fine adjustment drive clutch 61 simultaueously releases the brake 60 thereby permitting the manual adjustment of the position of the carriage.

It may be seen that with the carriage drive combination disclosed, the operator may actuate the electric drive motor 56 thereby to impart a fast feed to the carriage as it traverses the distance between the testing chambers. With the carriage approximately located over the test chamber located over the test chamber, the electric drive may be discontinued and the manual fine adjustment drive may then be utilized to position the carriage accurately relative to the test chamber. Limit switches may be provided at either end of the carriage track thereby to limit the permissible extent of travel of the carriage.

Inasmuch as the testing locations 13 are permanently mounted in a testing bench, it is necessary that the carriage, in traversing the longitudinal extent of the tracks 20, 21, maintain a controlled position relative to the testing stations. To the accomplishment of that end, the lower crown wheels 41 engage the specially machined plates 43 so that there is no appreciable vertical variation in the position of the carriage at any point along the tracks 20, 21. Similarly, the rubber wheels 48 engage the flat surface of the plate 50 so that there is no tendency on the part of the carriage to deviate from its normal path of travel longitudinally of the tracks 20, 21. A special problem is presented by the engagement of the upper wheels 33 with the sloping surface of the leg 40 on the I-beams constituting the tracks 20, 21. However, by utilization of a crowned configuration, the sloping surface has no effect on the longitudinal travel of the carriage.

To assure the exact transverse alignment of the carriage as it travels along the tracks 20, 21, there is provided on the longitudinal frame member 26 two side guide wheels 66 which are adapted to engage the machined edge 43($a$) of the machined plate 43 on the track 20. The side guide wheels 66 are each carried in a mounting member 67 which is pivoted at 68 to the frame member 26. The member 67 is urged by a spring 69 to a position which engages the guide wheel 66 with the edge 43($a$) of the plate 43. Similar side guide wheels 70 are provided on the frame member 27 and are adapted to engage the machined edge 43($b$) of the plate 43 on the track 21. However, the guide wheels 70 are rotatably carried in a bracket 71 which is rigidly secured to the frame member 27; thus, the edge 43($b$) serves as a fixed reference against which the carriage is biased laterally by the action of the spring 69 biasing the wheels 66 against the plate 43 on the track 20. It may be seen that by utilization of the side guide wheels 66 and 70 and the provision of machined surfaces on the plates 43, there is provided means whereby the carriage will traverse the longitudinal extent of the tracks 20, 21 in a controlled horizontal position and without any appreciable lateral deviation thereby assuring the exact alignment of the carriage relative to the testing locations at any given point along the tracks.

Turning to the compression testing apparatus, there is illustrated in FIG. 6 a loading assembly which includes a fluid cylinder 76 secured to a mounting bracket 75 on the carriage. The cylinder 76 includes an extensible piston rod 77 having a threaded portion 78 at one end thereof. A transducer housing 79 is secured on the threaded end 78 of the rod 77 and receives a transducer assembly 80 which is adapted to cooperate with a loading plate in the test cylinder 81 in a manner to record, by electrical impulses transmitted through wire 82, the compressive force applied to the soil specimen. The wiring 82 is connected to a chart recorder 83 mounted on the instrument panel 84 supported by the carriage assembly.

The cylinder 76 includes an air inlet 85 whereby compressed air is introduced into the cylinder to actuate the movement of the piston rod 77. A piston control assembly 86 is provided at the upper end of the fluid cylinder and includes a micrometer adjustment 87 whereby the rate of travel of the piston rod 77 may be adjusted. A valve 88 is associated with the air inlet 85 and a pilot valve 89 is associated with the control assembly.

Figure 7:
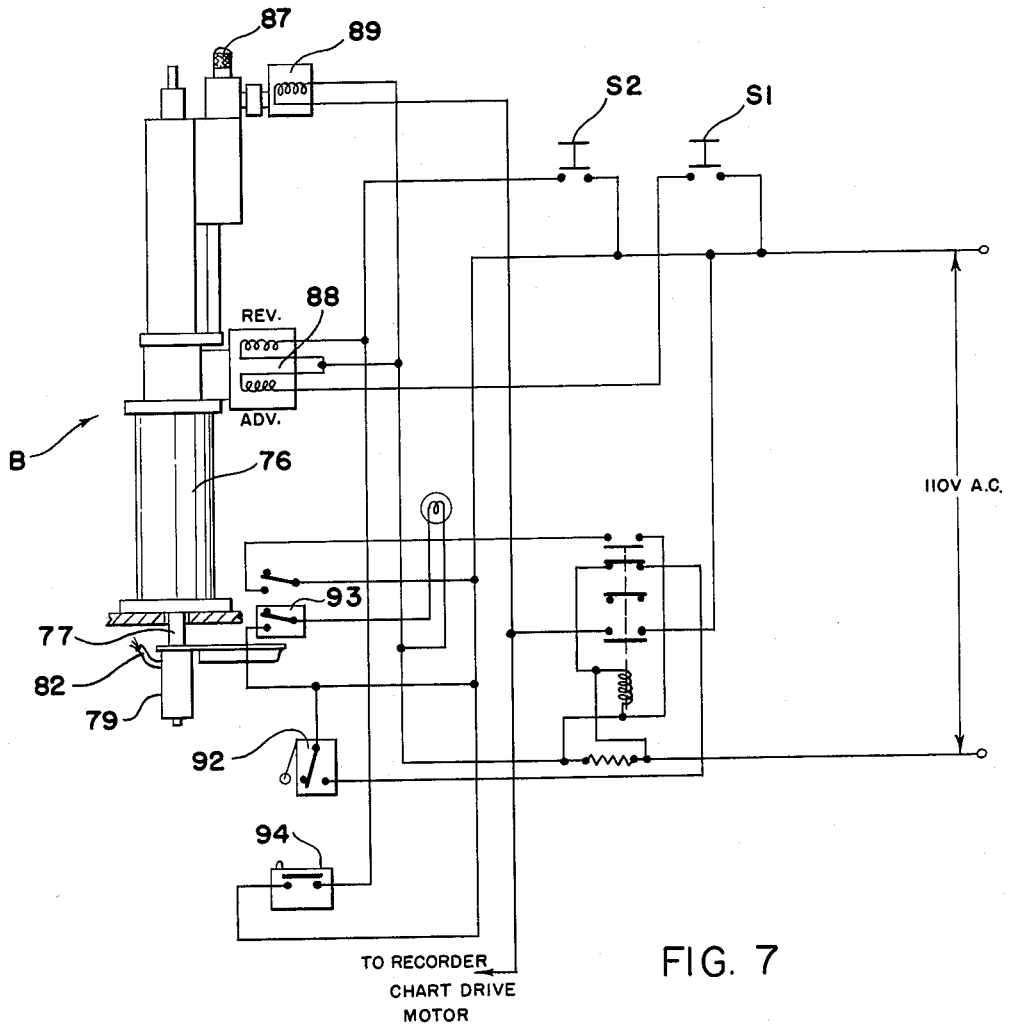
FIG. 7 is a schematic wiring diagram illustrating the compression testing cycle.

An actuating lever 90 is secured to the piston rod 77 for movement therewith. The lever 90 is adapted to cooperate with appropriate microswitches to limit the travel of the piston rod 77. There is shown a lower limit switch 91 which is actuated by the lever 90 to define the lower limit of travel of the piston rod 77. The lever 90 also cooperates with a skip check limit switch 92 which is used for purposes hereinafter described. There is also provided an upper limit switch 93 which serves to limit the return travel of the piston rod, such upper limit switch being shown schematically in FIG. 7.

The lower limit switch 91 and the skip check limit switch 92 are mounted for adjustment relative to the frame of the machine. The limit switch 91 includes a transverse support 94 which is slidable along spaced apart guide rods 95 carried by plates 96, 97. A threaded screw shaft 98 is rotatably received in appropriate bearings at either end thereof with the shaft being in threaded engagement with the transverse support 94 so that upon rotation of the screw shaft, the support 94 is caused to be moved longitudinally of the shaft and the guide rods 95. Rotation is imparted to the screw shaft 98 by a hand wheel 99 which is rotatably mounted on the instrument panel 84 and connected by a shaft 100 and bevel gear arrangement 101 to the screw shaft 98.

A similar arrangement is used as a means for adjustably mounting the check switch 92 and includes a hand wheel 102 mounted on the instrument panel 84. The check switch 92 is adapted to initiate actuation of the recorder chart and the pilot valve 89 mechanism so that the rate of travel of the piston rod 77 is automatically reduced and the recorder chart begins recording the data transmitted by the transducer 80. Thus, the switch 92 serves the function of initiating the data collecting phase of the compression cycle with the switch 93 merely serving as a return control switch. The travel of the piston rod 77 between the upper switch 93 and the check switch 92 is at a rapid rate and it is only when the switch 92 has been actuated by the arm 90 that the rate of travel decreases and the testing operation begins.

In order to obtain accurate data for the compression test, it is necessary that the rate and length of travel of the piston rod 77 be closely controlled. This is particularly true where a series of samples are to be tested by the same machine with each of the samples varying in height relative to the compression testing apparatus. Accordingly, it is necessary to adjust the apparatus so that the transducer will exert a deforming pressure on each soil specimen at exactly the same point in each test cycle.

In order to accomplish this purpose, there is included on the test panel 84 an opening 105 through which the operator may align the test specimen with the compression testing apparatus. Below the opening 105 there is a second opening 106 adjacent to which there is secured on the panel 84 a cathetometer 107. The cathetometer includes a column 108 on which there is movably mounted an optical telescope 109 with the column 108 having appropriate scale markings thereon. A similar scale is provided behind a glass-covered opening 110 intermediate the hand wheels 99 and 102.

The cathetometer is used in the following manner. With a sample generally aligned with the testing apparatus, as viewed by the operator through opening 105, the operator adjusts the optical telescope along the column 108 until he has sighted through the opening 106 a marking on the test cylinder indicating the height of the soil specimen in the cylinder. With the height of the soil specimen ascertained, the operator may then take the reading from the calibrated column 108 and adjust the hand wheel 102 so that the switch 92 will be adjusted to a point where it will be actuated by the lever 90 just as the transducer engages the top of the soil specimen. Similarly, the hand wheel 99 may be rotated so that the lower limit switch 91 is set to the point where it is desired to end the test cycle.

Having described the essential elements of the invention, a typical operating cycle is as follows:

Appropriate soil specimens are procured and placed in the individual test chambers, illustrated in FIG. 1. With the soil specimens in place, an appropriate switch is actuated which energizes motor 57 and clutch 19 and at the same time deenergizes the electric brake 60. With the motor energized, rotation is imparted to the pinion 52 which drives the gear 51 and the wheels 48. The wheels 48 being in frictional contact with the plate 50 on each of the tracks 20, 21 cause the carriage to move longitudinally of the tracks. The operator continues the drive of the electric motor until the compression loading assembly is approximately located over the test specimen, at which time, the electric motor is deenergized. The operator then energizes clutch 61 and, by rotating the hand wheel 65, manually adjusts the position of the carriage until the compression loading assembly is directly centered over the soil specimen, at which time, the clutch is deenergized and the electric brake is engaged thereby locking the carriage and the assembly in position over the specimen. The operator then, in the manner above described, uses the optical telescope 109 to ascertain the height of the soil specimen and uses this reading to adjust the position of the check switch 92 and the lower limit switch 91 by rotation of their respective hand wheels 102, 99. With the carriage centered and the soil specimen height determined, the assembly is prepared for the test operation which is initiated by depression of the switch S1. With depression of the switch S1, the valve 88 is energized to permit entry of compressed air into the cylinder chamber 76 and cause the rapid travel of the piston rod 77 toward the soil specimen. As the rod 77 continues toward the soil specimen and the transducer 80 is about to engage the specimen, the actuating lever 90 engages the check switch 92 which deenergizes valve 88 and energizes valve 89 thereby causing a decrease in the rate of travel of the piston rod. At the same time, the switch 92 actuates the drive for the recorder chart and the test cycle has begun. A compressive force is exerted on the soil specimen with the resistance to deformation offered by the specimen being measured by the transducer and recorded by the recorder chart. At a predetermined level of deformation, the actuating arm 90 engages the lower limit switch 94 which deenergizes valve 89 and energizes valve 88 in a reverse position thereby reversing the travel of the piston rod 77 and automatically discontinuing the recording chart drive. The piston rod 77 then returns to a position in which it engages the upper limit switch 93 and the test cycle is completed. An emergency retraction switch S2 is provided so that the operator can discontinue the test cycle in the event that an obstruction is encountered or a failure occurs.

It is to be noted that as the compressive force is exerted against the soil specimen, there is an equal upward reaction exerted on the carriage. In order to obtain an accurate record of the soil deformation, it is necessary that the carriage and track be absolutely rigid during the performance of the test. This is accomplished by the provision of the specially machined plates 43 on the tracks 20, 21, which plates serve as a reference plane for the testing apparatus. The lower wheels 41 are of a hardened steel composition and cooperate with the plates 43 to withstand the reaction of the compressive force without measurable deformation.

It is believed apparent that the objects set forth are fully accomplished by the device hereinabove described and disclosed. Thus, by the utilization of the instant invention, it is possible to perform a large volume of compression tests with a single piece of equipment. Moreover, there is provided a machine which automatically performs the compression test with only the alignment of the machine with the soil specimen being required. Further, the machine provides a mechanism whereby accurate and truly comparable test data may be obtained.

For ease of description, the principles of the invention have been set forth in connection with but a single illustrated embodiment. It is not our intention that the illustrated embodiment or the terminology employed in describing it be limiting inasmuch as variations in these may be made without departing from the spirit of the invention; but rather, it is our desire to be restricted only by the scope of the appended claims.

We claim:
1. A machine for conducting a compression test on soil samples comprising;
   a pair of spaced apart parallel tracks having upper and lower surfaces thereon;
   each of said tracks having a plate secured to the lower surface thereof;
   each plate having an accurately milled surface over a portion thereof defining a reference plane;
   a carriage;
   a first set of wheels;
   rod means securing each of said first set of wheels to said carriage for sliding movement toward and away from said carriage; and
   spring means associated with each of said first set of wheels, said spring means biasing said first set of wheels toward said carriage and into engagement with the upper surface on said tracks;
   a second set of wheels rotatably secured to said carriage, said second set of wheels being in engagement with the milled surfaces on said plates; and
   driving wheels mounted on said carriage and being in engagement with the remaining portion of said plates;
   aligning means associated with said carriage and being operable to maintain said carriage in alignment with said tracks for longitudinal movement therealong;
   first and second drive means secured to said carriage and being selectively operable to drive said drive wheels;
   cylinder means mounted on said carriage and including a movable piston adapted to exert a compressive force on a soil sample;
   said second set of wheels and said milled surfaces on said plates being adapted to coact to resist the reaction resulting from the compressive force of said piston on the soil sample;
   switch means on said carriage and adapted to cooperate with said piston thereby to limit the travel of said piston over a predetermined range of movement;
   manually adjustable means mounting said switch means on said carriage whereby the position of said switch means may be varied according to the height of a soil sample; and
   means on said carriage for determining the height of the soil sample.

2. A soil compression testing apparatus comprising:
   a horizontal track;
   a carriage;
   means suspending said carriage from said track for longitudinal movement therealong;
   a drive assembly on said carriage operable to move said carriage along the length of said track;
   said drive assembly including a plurality of hardened steel wheels rotatably secured to said carriage;
   a load cylinder secured to said carriage and adapted to exert a downward thrust in a direction transverse to said track;
   a rigid test stand beneath said track;
   a plurality of vertically extending spaced apart test cylinders on said stand beneath said track;
   each of said test cylinders being adapted to receive a soil specimen therein;
   means for actuating said load cylinder to compressively engage the soil specimen in the selected one of said test cylinders;
   means on said carriage limiting the compressive movement of said cylinder to a predetermined range of movement;
   means to measure the deformation of the specimen in response to the compressive load of the cylinder; and
   reference means on said track cooperating with said drive assembly for absorbing the reactive thrusts of said loading cylinder whereby vertical deviation of said carriage is prevented when said soil specimens are compressed by said load cylinder;
   said reference means comprising a machined surface on the lower surface of said track;
   said machined surface being engaged by said hardened steel wheels.

3. In combination;
   a pair of parallel, horizontal, spaced apart tracks, each having an upper and lower surface;
   the lower surface of each of said tracks including a plate secured to the under side thereof and extending the longitudinal length thereof;
   the lower surface of each of said plates including a machined surface extending over a portion of its width and constituting a longitudinal, horizontal, reference plane;
   each of said plates further including a machined surface on the interior edge thereof constituting transverse reference planes;
   a carriage including a frame;
   a plurality of suspension wheels secured to said frame and in engagement with the upper surface of said tracks thereby supporting said carriage on said tracks for rolling movement therealong;
   a plurality of reaction wheels secured to said frame and in engagement with said machined lower surface on said plates;
   a drive assembly secured to said frame;
   said drive assembly including a plurality of driving wheels in engagement with the unmachined lower surface on said plates;
   transverse aligning means secured to said frame;
   said transverse aligning means including means fixedly secured to said carriage and in abutting engagement with said machined interior edge of said plate on one of said tracks;
   said aligning means further including means pivotally secured to said frame and resiliently biased into engagement with said machined interior edge on said plate of the other of said tracks;
   an adjustable loading cylinder secured to said frame and being adapted to impart a compressive force against a soil sample placed therebeneath;
   said loading cylinder including a piston movable over a predetermined range of travel;
   sighting and aligning means secured to said frame for determining the range of travel of said piston; and
   limit adjusting means secured to said frame and adapted to co-operate with said piston for limiting the travel of said piston to the range determined by said sighting and aligning means.

4. In combination;
   a pair of parallel, horizontal, spaced apart tracks, each having an upper and lower surface;
   the lower surface of each of said tracks including a plate secured to the under side thereof and extending the longitudinal length thereof;
   the lower surface of each of said plates including a machined surface extending over a portion of its width and constituting a longitudinal, horizontal, reference plane;
   each of said plates further including a machined surface on the interior edge thereof constituting transverse reference planes;
   a carriage including a frame;
   a plurality of suspension wheels secured to said frame and in engagement with the upper surface of said tracks thereby supporting said carriage on said tracks for rolling movement therealong;

a plurality of reaction wheels secured to said frame and in engagement with said machined lower surface on said plates;

transverse aligning means secured to said frame;

said transverse aligning means including means fixedly secured to said carriage and in abutting engagement with said machined interior edge of said plate on one of said tracks;

said aligning means further including means pivotally secured to said frame and resiliently biased into engagement with said machined interior edge on said plate on the other of said tracks;

drive means operably associated with said carriage for moving said carriage along said tracks; and compression testing apparatus secured to said frame of said carriage for movement along said tracks with said carriage.

5. A soil compression testing mechanism comprising;

a track;

a test stand beneath said track;

a plurality of test cylinders spaced along said stand in alignment with said track with each of said test cylinders being adapted to receive a soil sample therein;

a carriage;

means mounting said carriage on said track for movement therealong;

an adjustable loading cylinder secured to said carriage and being adapted to impart a compressive force against a soil sample placed therebeneath;

said loading cylinder including a piston movable over a predetermined range of travel;

sighting and aligning means secured to said carriage for determining the range of travel of said piston;

said sighting and aligning means including an optical piece and a vertical scale;

said optical piece being mounted on said carriage for movement vertically along said scale whereby the vertical height of a soil sample in a test cylinder may be determined; and switch means secured to said frame and adapted to co-operate with said piston for limiting the travel of said piston to the range determined by said sighting and aligning means.

6. The combination of claim 5 and including manually adjustable means mounting said switch means on said carriage whereby the position of said switch means may be varied thereby to vary the range of travel of said piston.

7. In combination;

a pair of parallel, horizontal, spaced apart tracks, each having an upper and lower surface;

the lower surface of each of said tracks including a plate secured to the under side thereof and extending the longitudinal length thereof;

the lower surface of each of said plates including a machined surface extending over a portion of its width and constituting a longitudinal, horizontal, reference plane;

each of said plates further including a machined surface on the interior edge thereof constituting transverse reference planes;

a carriage including a frame;

spring means suspending said carriage from the upper surface of said tracks;

a plurality of reaction wheels secured to said frame and in engagement with said machined lower surface on said plates;

transverse aligning means secured to said frame;

said transverse aligning means including means fixedly secured to said carriage and in abutting engagement with said machined interior edge of said plate on one of said tracks;

said aligning means further including means pivotally secured to said frame and resiliently biased into engagement with said machined interior edge on said plate of the other of said tracks whereby said resiliently biased aligning means urges said carriage in a direction away from said other of said tracks.

8. A compression testing apparatus comprising in combination:

a track;

said track comprising a pair of parallel, horizontally spaced apart tracks each having an upper and lower surface;

the lower surface of each of said tracks including a plate secured to the underside thereof and extending the longitudinal length thereof;

the lower surface of each of said plates including a machined surface extending over at least a portion of its width and constituting a longitudinal horizontal reference plane;

a carriage;

resilient means secured to said carriage and suspending said carriage from said track;

said resilient means including a plurality of suspension wheels secured to said carriage and in engagement with the upper surface of said tracks thereby supporting said carriage on said tracks for rolling movement therealong;

a plurality of reaction wheels secured to said carriage and in engagement with said machined lower surface on said plate;

drive means on said carriage operably associated with said wheels for moving said carriage along said tracks; and compression loading apparatus secured to said carriage for movement therewith;

said compression loading apparatus being adapted to compress a soil sample placed therebeneath.

References Cited by the Examiner

UNITED STATES PATENTS

| | | | |
|---|---|---|---|
| 500,660 | 7/1893 | Kisinger | 100—221 X |
| 2,245,080 | 6/1941 | Pendleton | 73—94 |
| 2,247,787 | 7/1941 | Schmidt | 105—153 X |
| 2,546,957 | 3/1951 | Ray | 77—62 |
| 2,791,120 | 5/1957 | Dietert et al. | 73—94 X |
| 3,074,354 | 1/1963 | Wakkila | 105—153 X |

FOREIGN PATENTS

| | | |
|---|---|---|
| 456,348 | 8/1913 | France. |
| 612,770 | 5/1935 | Germany. |

RICHARD C. QUEISSER, *Primary Examiner.*

LOUIS MOK, G. M. GRON, *Examiners.*